Patented Dec. 24, 1935

2,025,094

UNITED STATES PATENT OFFICE 2,025,094

AZO DYE AND METHOD FOR ITS PREPARATION

Miles Augustinus Dahlen, Wilmington, Del., assignor to E. I. du Pont de Nemours & Company, Wilmington, Del., a corporation of Delaware No Drawing. Application July 14, 1932,
Serial No. 622,460

19 Claims. (Cl. 260—95)

This invention relates to azo dyes and more particularly refers to azo dyes which are insoluble in water, and yield valuable pigment dyes, or fast dyeings and printings when prepared on the fiber.

It is an object of this invention to produce azo dyes either in aqueous solution or suspension, or on the fiber, which have good fastness to washing, light and chlorine. Additional objects will appear hereinafter.

These objects are accomplished by the present invention wherein arylamides of beta-hydroxy-naphthoic acid having the following general formula:

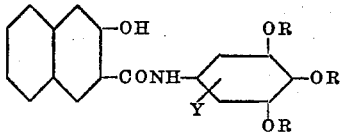

in which R represents an alkyl group, and Y represents hydrogen or a halogen group, are coupled with a diazotized aromatic amine which is free from any group rendering the dyestuff water soluble. The dyes obtained thereby have the following general formula:

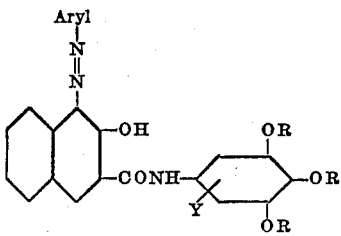

in which aryl represents an aryl nucleus of the benzene, diphenyl, diphenylamine, naphthalene, anthraquinone, azobenzene, or carbazole series which contains no group, such as the sulfonic-acid or carboxylic-acid group, which would render the dye water soluble, but which may contain groups such as alkyl, alkoxy, halogen, nitro, and benzoyl-amino and the other letters have the same meaning as in the preceding paragraph.

This invention may be more completely understood by reference to the following examples in which the parts given are by weight:

*Example 1*

Well-boiled and dried cotton yarn was impregnated with a padding solution prepared as follows:

8 parts of the 3,4,5-trimethoxy-anilide of beta-hydroxy-naphthoic acid were stirred with 20 parts of sodium hydroxide solution of 20% strength and 20 parts of Turkey red oil until a smooth paste was obtained. Hot water was then added to give a total volume of 300 parts.

The padded skeins were wrung as dry as possible and developed without further drying in a diazo solution prepared as follows:

10 parts of 4-nitro-2-amino-anisole, 15 parts of hydrochloric acid of 22° Bé., and 100 parts of boiling water were stirred until a complete solution was obtained. The solution was then cooled to 25° C., and 160 parts of ice added. The base was then diazotized by the addition of 25 parts of sodium nitrite solution of 20% strength. When diazotization was complete, 25 parts of sodium acetate were added to neutralize the mineral acidity.

When the development of the dyestuff was complete, the skeins were rinsed, soaped, rinsed and dried as above.

By the above process, a bright yellowish-red dyeing of good fastness to washing and fair fastness to light was obtained. The dye probably possessed the following formula:

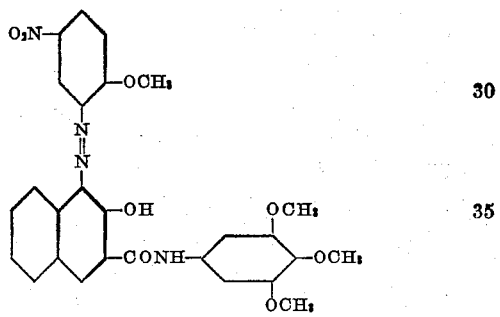

*Example 2*

Skeins prepared as in Example 1 were developed in a diazo-bath prepared as follows:

Alpha-amino-anthraquinone was dissolved in 10 parts of sulfuric acid of 66° Bé., and the solution cooled by external means to 5–10° C. Slightly more than the theoretical quantity of solid sodium nitrite was added during 15 minutes, holding the temperature at 10–18° C. After stirring for one hour to complete the diazotization, during which time the temperature was slowly raised to 30° C., the solution was poured onto ice. The precipitated diazo-salt was filtered and washed with strong sodium sulfate solution. It was then dissolved in water at 30–35° C., and a little sodium acetate added.

When the development in the above bath was complete, the skeins were washed, soaped and rinsed as before. By the above process, a bright red dyeing of excellent fastness to light and washing was produced. The dye had the following probable formula:

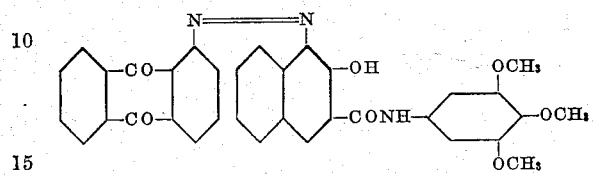

*Example 3*

Skeins were padded as in Example 1, substituting 10 parts of the 3-4-5-triethoxy-aniline of beta-hydroxy-naphthoic acid for the methoxy derivative. The padded yarn was developed in the following diazo solution:

4 parts of 4,4'-diamino-diphenylamine were dissolved in 20 parts of hot water, the solution cooled, and 50 parts of cold water, 10 parts of HCl of 22° Bé. and 20 parts of ice added. The base was tetrazotized by the addition of 3 parts of sodium nitrite in 10 parts of water. After stirring for 10 minutes, the solution was neutralized with chalk and 5 parts of magnesium sulfate added.

After the development of the dyestuff, and the rinsing and soaping of the skeins, a bluish-black dyeing of fair fastness to light and good washing fastness was obtained. The dye had the following probable formula:

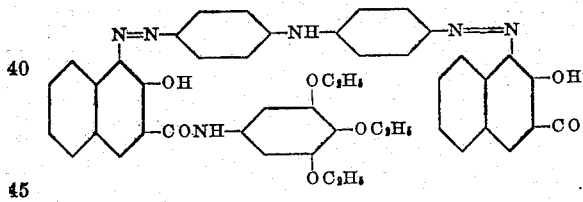

By processes similar to the above, a large number of dyeings may be produced, as will be readily understood. The following table indicates a few more combinations, but these represent only a small fraction of the total number of valuable dyeings which may be produced according to the present invention.

| Example No. | Diazotized base | Arylide of beta-hydroxy-naphthoic acid | Color produced |
|---|---|---|---|
| 4 | 2-Amino-5-benzoylamino-1, 4-dimethoxy-benzene. | 3-4-5-Trimethoxy-anilide. | Blue. |
| 5 | 2-5-Dichloro-aniline | do | Scarlet. |
| 6 | 5-Nitro-2-amino-anisole. | 3-4-5-Triethoxy-anilide. | Red. |
| 7 | 4-Chloro-2-nitraniline | do | Do. |
| 8 | Alpha-naphthylamine | 3-4-5-Tripropoxy-anilide. | Corinth. |

In practicing the process of the present invention the aromatic amino compound may contain an aryl nucleus of the benzene, diphenyl, diphenylamine, naphthalene, azobenzene, anthraquinone, or carbazole series. This nucleus may have various groups substituted thereon such as alkyl, alkoxy, halogen, nitro, and benzoyl-amino, but should not contain any groups, such as the sulfonic acid or carboxylic acid groups, which would render the dyestuff water soluble. The arylamide nucleus contains 3 alkoxy groups which may be either the same or different. In addition, the arylamide nucleus may have substituted therein a halogen atom, chlorine having been found to give excellent results.

The products of the present invention show good fastness to washing, light and chlorine. They produce beautiful bright colors and may be readily manufactured at a cost comparing favorably with products now in use for preparing similar colors.

As many apparently widely different embodiments of this invention may be made without departing from the spirit and scope thereof, it is to be understood that I do not limit myself to the specific embodiments thereof except as defined in the appended claims.

I claim:

1. A process for producing water-insoluble azo dyes which comprises coupling a diazotized aromatic amine with an arylamide of beta-hydroxy-naphthoic acid having the following general formula:

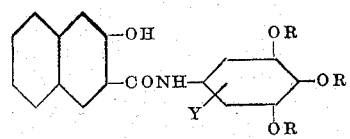

in which R represents an alkyl group, and Y represents hydrogen or a halogen group.

2. A process for producing water-insoluble azo dyes which comprises coupling a diazotized aromatic amine of the benzene or naphthalene series, free from carboxylic and sulfonic acid groups, with an arylamide of beta-hydroxy-naphthoic acid having the following general formula:

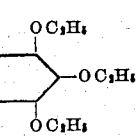

in which R represents an alkyl group.

3. A process for producing water-insoluble azo dyes which comprises coupling a diazotized aromatic amine of the benzene series, free from carboxylic and sulfonic acid groups, with an arylamide of beta-hydroxy-naphthoic acid having the following general formula:

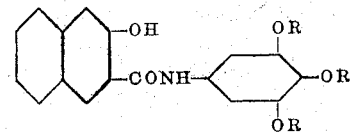

in which R represents a methyl or ethyl group.

4. A process for producing water-insoluble azo dyes which comprises coupling a diazotized amine of the benzene series, free from carboxylic and sulfonic acid groups, with an arylamide of betahydroxy-naphthoic acid having the following general formula:

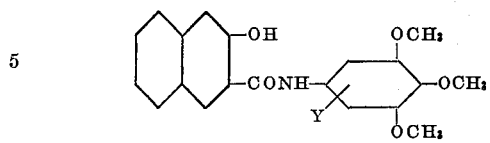

wherein Y represents hydrogen or a chloro group.

5. A process for producing an azo dye which comprises diazotizing alpha-amino-anthraquinone and coupling it to the 3,4,5-trimethoxy-anilide of beta-hydroxy-naphthoic acid.

6. A process for producing a water-insoluble azo dye which comprises coupling diazotized 4-nitro-2-amino-anisole with the 3-4-5-trimethoxy-anilide of beta-hydroxy-naphthoic acid.

7. Water-insoluble azo dyes having the following general formula:

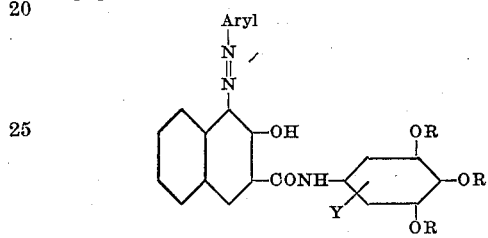

in which aryl represents an aromatic nucleus, R represents an alkyl group, and Y represents hydrogen or a halogen group.

8. Water-insoluble azo dyes having the following general formula:

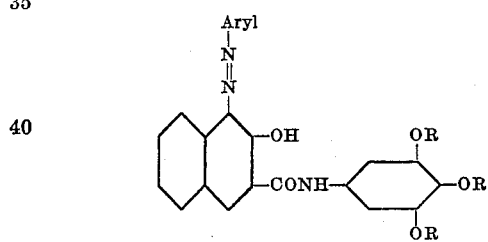

in which aryl represents an aromatic nucleus, of the benzene or naphthalene series, free from carboxylic and sulfonic acid groups, and R represents an alkyl group.

9. The product of claim 8 wherein the arylamide nucleus of the coupling component contains a halogen group.

10. Water-insoluble azo dyes having the following general formula:

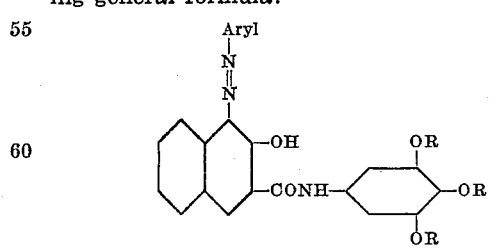

in which aryl represents an aromatic nucleus, of the benzene series, free from carboxylic and sulfonic acid groups, and R represents a methyl or ethyl group.

11. The product of claim 10 wherein the arylamide nucleus of the coupling component contains a halogen group.

12. Water-insoluble azo dyes having the following general formula:

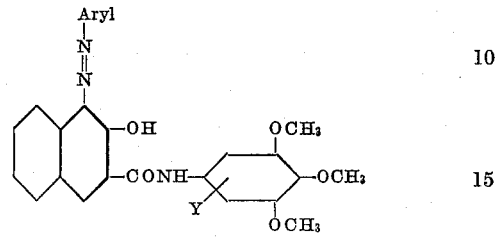

wherein aryl represents an aromatic nucleus of the benzene series, free from carboxylic and sulfonic acid groups, and Y represents hydrogen or a chloro group.

13. An azo dye having the following formula:

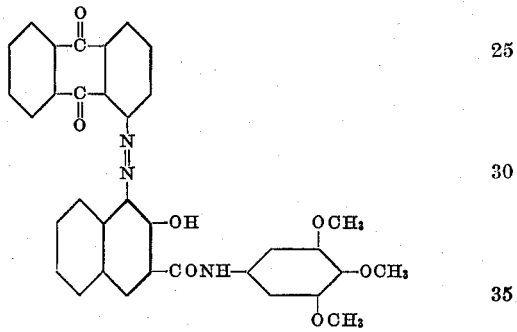

which imparts a bright red color to cotton material.

14. A water-insoluble azo dye having the following formula:

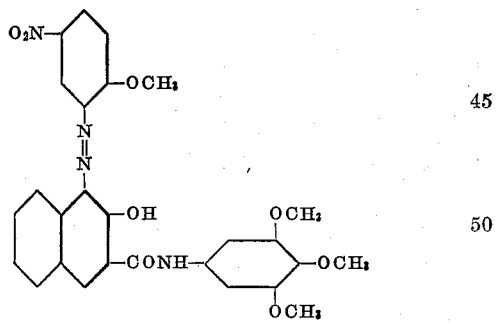

15. Fiber dyed with dyestuffs as claimed in claim 7.
16. Fiber dyed with dyestuffs as claimed in claim 8.
17. Fiber dyed with dyestuffs as claimed in claim 12.
18. Fiber dyed with the dyestuff claimed in claim 13.
19. Fiber dyed with the dyestuff claimed in claim 14.

MILES AUGUSTINUS DAHLEN.